United States Patent [19]

Jakubowski

[11] Patent Number: 4,507,409

[45] Date of Patent: Mar. 26, 1985

[54] THIXOTROPIC MIXTURES OF LIQUID POLYESTERS AND POLYMER-TREATED FILLERS

[75] Inventor: James J. Jakubowski, Midland, Mich.

[73] Assignee: The Dow Chemical Company, Midland, Mich.

[21] Appl. No.: 576,298

[22] Filed: Feb. 2, 1984

Related U.S. Application Data

[63] Continuation-in-part of Ser. No. 464,446, Feb. 7, 1983, abandoned.

[51] Int. Cl.$^3$ ................................................ C08K 3/10
[52] U.S. Cl. .................................... 523/205; 523/209; 523/505; 523/514; 523/523; 524/513
[58] Field of Search ............... 523/205, 209, 505, 514, 523/523; 524/513

[56] References Cited

U.S. PATENT DOCUMENTS

| | | | |
|---|---|---|---|
| 3,471,439 | 10/1969 | Bixler et al. | 523/202 |
| 3,532,662 | 10/1970 | Ansdell | 523/206 |
| 3,773,708 | 11/1973 | Takahashi et al. | 106/308 Q |
| 3,926,873 | 12/1975 | Aishima et al. | 525/36 |
| 4,071,494 | 1/1978 | Gaylord | 524/432 |
| 4,369,272 | 1/1983 | Jaffe | 523/205 |

*Primary Examiner*—Lewis T. Jacobs
*Attorney, Agent, or Firm*—Donald Corneglio

[57] ABSTRACT

A filled resin composition having thixotropic properties is prepared by blending (a) a liquid polyester resin, and (b) a solid filler (such as calcium carbonate), which has been treated with an effective amount of a polymer prepared from (1) an addition polymerizable organic monomer which does not contain an acid group and (2) an addition polymerizable acid. The preferred polymer is ethylene/acrylic acid.

10 Claims, No Drawings

4,507,409

THIXOTROPIC MIXTURES OF LIQUID POLYESTERS AND POLYMER-TREATED FILLERS

RELATED U.S. APPLICATION DATA

This application is a continuation-in-part of U.S. Ser. No. 464,446, filed Feb. 7, 1983, now abandoned.

BACKGROUND OF THE INVENTION

This invention generally relates to liquid polyester resins with surface treated fillers. Further, this invention relates to the use of the surface treated fillers in liquid polyester resins to provide improved thixotropic properties.

The use of fillers in plastic fabrication to enhance physical properties as well as reduce costs is well known in the art. However, when fillers are used in large amounts to increase the viscosity of a plastic the filler can have an adverse affect on the physical properties of the plastic. It has therefore become desirable to control viscosity by other means.

Viscosity control is an important part of many plastic fabrication processes. Many manufacturers add a thixotropic agent to cause the liquid resin formulation to have a higher viscosity at high shear rates than at low shear rates, (i.e., thixotropic properties). Thixotropic resin formulations have utility in a variety of applications, particularly, in coatings, spray-up applications, impregnation of fiber mats, and gel coats where low shear viscosities allow ease of application and higher unsheared viscosities prevent dripping, sagging and running once the resin has been applied. The anti-sag, anti-run properties are particularly desirable for applications involving vertical surfaces where sagging and running are significant problems.

A typical (but expensive) thixotropic agent is fumed silica. Generally, the thixotrope is added in addition to other fillers and additives in resin formulations. Fillers, such as, calcium carbonate or alumina trihyrate are commonly used in liquid resin formulations to reduce cost, increase stiffness or impart other desirable properties such as fire retardance but often these fillers do not impart thixotropic properties to the resin formulation. Accordingly, it would be desirable to modify these fillers with a surface treatment such that these fillers would impart to the resin formulation thixotropic properties without the need of additional thixotropic agents.

SUMMARY OF THE INVENTION

The present invention provides for a filled resin composition having thixotropic properties comprising (a) a liquid polyester and (b) a solid filler which has been treated with an effective amount of a polymer of (1) an addition polymerizable organic monomer which does not contain an acid group, and (2) an addition polymerizable acid. The solid filler is preferably treated with ethylene/acrylic acid. A major advantage of the present invention is that the treated filler provides thixotropic properties to the liquid polyester.

The present invention further provides for a cured solid comprising the aforementioned filled resin, which has been cured to form a solid, insoluble product.

DETAILED DESCRITION OF THE INVENTION

As a first component, the filled resin compositions of this invention require a liquid unsaturated polyester resin or a liquid vinyl ester resin. Other liquid resins, such as, saturated polyester can also be employed; however, due to difficulty in curing and limited applications they are not as useful as the preferred unsaturated polyester resins.

Liquid unsaturated polyester resins are commonly polyester polymers dissolved in a vinyl unsaturated monomer, as a reactive diluent, such as, styrene. It is generally known in the art that by varying the composition and molecular weight of the base polyester polymer and the amount, type of reactive diluents, and other additives, polyester resins can be formulated to exhibit a wide range of process and end-performance properties.

Similarly, vinyl ester resins can be formulated to give a range of process and end-performance properties by varying the composition and molecular weight of the vinyl ester polymer and the use of vinyl monomers as reactive diluents. Other additives generally known to those skilled in the art can also be employed to vary the process and end-performance properties.

Compositions of unsaturated polyester resins and vinyl ester resins and formulations of these polymers with vinyl monomers commonly used in the art are in the scope of the invention. Typical monomers include vinyl or ethylenically unsaturated monomers or acrylic acid such as styrene vinyltoluene, t-butylstyrene, chlorostyrene, divinylbenzene, dicyclopentadiene acrylate, sec-butylacrylate, ethyl acrylate, and the like.

As a second component, the practice of the invention requires the use of a solid filler which has been contacted with an effective amount of a polymer of an addition polymerizable organic monomer which does not contain an acid group, and an addition polymerizable acid.

The preparation of the fillers useful in the invention requires the use of an alkali-dispersible polymer of (1) an addition polymerizable organic monomer which does not contain an acid group (non-acid monomer), and (2) an addition polymerizable acid (acid monomer).

The organic monomer which does not contain an acid group may be of a wide variety of addition polymerizable monomers. Representative of suitable monomers include esters of acrylic acid or methacrylic acid, such as ethyl methacrylate, and unsaturated aromatic monomers such as styrene. A particularly preferred class of monomers includes acyclic alkenes having α-unsaturation.

The term "acyclic alkene having α-unsaturation" is meant to include noncyclic compound having a terminal, addition polymerizable double bond, as long as the compound is copolymerizable with the acid comonomer component, and the final polymer will be dispersible in an aqueous alkaline medium. Examples include ethylene, propylene, 1-butene, and 1,3-butadiene. Ethylene and propylene are preferred, and ethylene is most preferred. Of course, mixtures of these monomers may be used. Comonomers containing ethylene and a lesser amount of propylene are suitable.

The term "addition polymerizable acid" is meant to include ethylenically unsaturated compound having an acid group, provided the compound is copolymerizable with the non-acid monomer component.

The term "acid group" is meant to include a group capable of neutralization by aqueous alkali to form water-ionizable salt groups. Preferred acid groups include sulfonic (—SO$_3$H), carboxy (—CO$_2$H), and carboxylic acid anhydride groups. Carboxylic acids having monoethylenic unsaturation are preferred. Examples of such suitable carboxylic acids include itaconic acid, acrylic acid, methacrylic acid, fumaric acid, maleic acid, vinyl benzoic acid and isopropenyl benzoic acid. The more preferred species include acrylic, methacrylic, fumaric, itaconic and maleic acids. Most preferred is acrylic acid. Mixtures of these acids may also be used.

Other monomers may be included in minor amounts as long as the final properties of the dispersed solid are not significantly impaired and the polymer remains alkali dispersible.

The non-acid monomer and acid monomer are combined in proportions such that the final polymer will be dispersible in an aqueous alkaline medium. U.S. Pat. Nos. 3,472,825 and 3,779,901 provide information useful in predicting which polymers will be water dispersible in aqueous alkali (see especially Table I of U.S. Pat. No. 3,472,825). Generally, the copolymers useful in the instant invention desirably have from 5 to 35 weight percent, more desirably from 10 to 30 weight percent, preferably 15 to 25 weight percent and most preferably about 20 weight percent acid monomer, the remainder being non-acid monomer.

The monomers are reacted using conventional polymerization techniques to produce a normally solid, thermoplastic polymer. The molecular weight of the polymer is desirably such that its combined effect with the quantity of acid monomer present produces a particular melt flow viscosity for the polymer. This viscosity is desirably in the range of 100 to 500, more desirably 200 to 400, preferably 275 to 325 and more preferably about 300 (as measured by ASTM D-1238-65T, Procedure A, Method E).

After polymerization, the polymer is desirably combined with an aqueous medium.

While the polymer is generally insoluble in water, it may be dispersed in an aqueous alkaline solution. This solution forms a salt with the acid component of the polymer. U.S. Pat. NO. 3,779,901 teaches processes and conditions for dispersing the polymer. Desirably, a salt is formed with a monovalent anion. Preferably, a sodium or ammonium salt is formed. This copolymer is generally added in sufficient quantity to form desirably a 1 to 50 percent, preferably a 5 to 30 percent by weight solids dispersion.

The term "filler," is meant to include not only materials typically added to resins principally as an agent for adding volume, but it is also meant to include materials such as pigments and other solid particulate additives. The "fillers" are generally finely divided solids, for instance solids having particle diameters of about 0.05 to about 50 microns; however, they may also be fibers. Fillers useful in the instant invention generally include filler suitable for filling organic resin. The filler may be either basic or acidic in character. Examples of suitable fillers include calcium carbonate, talc, alumina trihydrate, titanium dioxide, lead chromate, mica, glass, and silica. It is generally known in the art that resins filled with small particle size fillers perform better than those filled with larger particles. This relationship holds true for the fillers used in the instant invention.

The filler is generally treated by contacting it with the polymer dispersion. That is, a method which allows the polymer to adhere to the surface of the filler is suitable. Preferred methods include the slurry treatment method described in U.S. Ser. No. 265,761, May 21, 1981, now abandoned, and a "dry treatment" method described in U.S. Ser. No. 532,801, Sept. 12, 1983 which is a continuation-in-part of U.S. Ser. No. 379,220, May 17, 1982, now abandoned. In the wet treatment method, the filler and polymer dispersion are blended together in an aqueous slurry. In the dry treatment method, however, the polymer dispersion and filler are blended together under conditions such that the filler does not substantially become slurried.

The polymer and filler are typically mixed until they are uniformly combined. Sufficient mixing generally may take place in a comparatively short period of time, for instance, five to 60 minutes. Conventional mixing equipment may be used.

The polymer is added to the filler in an amount sufficient to enable the filler to impart thixotropic properties to a liquid polyester resin. Generally, the proportion of polymer to filler will vary depending upon the particle size and surface area of the filler. Fillers with large surface areas and smaller particle diameters require greater proportions of the polymer to achieve the desired results. While the proportion of polymer to filler may vary over a wide range, generally the polymer will be present at about 0.5 to about 5.0 percent, more desirably from about 0.75 to about 3.0 percent, and preferably from about 1.0 to about 2.0 percent by weight, based on the weight of the filler. A minimum amount of polymer is needed to have a significant effect, but excess will be of no benefit.

After treatment, the filler is desirably dried and any aggregates broken up to return them to nearly their original particle size. Drying techniques which involve substantial agitation of the filler will minimize the formation of chunks.

The treated fillers may be incorporated into the liquid polyester resins in the same manner and in the same percentages as untreated fillers are normally incorporated. The treated fillers offer an advantage in that they impart thixotropic properties to the filled resin without the need of additional additives. In many instances, it may be possible to add higher percentages of filler than would normally be the case because of the thixotropic properties. Desirably, the fillers of the instant invention are incorporated into the organic resin in the range of 20 to 85 weight percent based on the weight of the organic resin. More desirably, the fillers are present in the range of from 20 to 60 weight percent. Generally, the polymer treatment of the filler and the incorporation of the treated filler into the liquid resin are such that the filled liquid resin has measurable thixotropic properties. The sheared and unsheared viscosities of the filled resin composition can be adjusted to the needs of the intended application. In general the sheared and unsheared viscosities increase as the amount of treated filler is increased in the resin formulation. Accordingly, applications requiring higher viscosities would incorporate more filler into the resin formulation.

The filled resins of the invention, when formulated with an addition polymerizable monomer, are well suited for use in the manufacture of fibrous laminates. Such laminates may be prepared by adding to the resin, a free radical or other suitable addition polymerization catalyst. The catalyzed mixture is then combined with fibers, and formed.

Examples of suitable catalysts include benzoyl peroxide, tertiary butyl hydroperoxide, methylethyl ketone peroxide, and the like. It is frequently of value to add accelerators such as cobalt naphthenate, dimethylaniline, and the like.

Examples of suitable fibers include asbestos, carbon, glass, and organic fibers. The fibers may be in addition to the treated filler, or, if suitably treated, they may be the treated filler.

The filled resin may be rolled, sprayed, or impregnated into the fibrous reinforcement and cured in a manner well known to those skilled in the art. Furthermore, the filled resins of the invention may be compounded with other additives such as release agents, stabilizers, other fillers, pigments and reinforcements and cured.

The invention will be further illustrated in the following examples. In the examples, all parts and percentages are by weight unless otherwise specified.

EXAMPLE 1

Part A: A copolymer of 20.0 percent acrylic acid and 80 percent ethylene is prepared as a solid thermoplastic having a melt flow viscosity of 300. The polymer is dispersed in an aqueous ammonium medium to provide a 20 percent solids colloidal dispersion.

Part B: 454 g of $CaCO_3$ and 1000 ml of water are combined to form a slurry. With stirring, 22.7 g of the 20 percent solids dispersion of Part A is added. This provides a mixture having 1 percent polymer based on the weight of the $CaCO_3$. The mixture initially thickens and then thins out after about 1 minute. The mixture is stirred for 1 hour at which time the treated $CaCO_3$ is recovered by centrifuge and dried at 100° C. overnight. After drying, the $CaCO_3$ is in the form of large chunks which are broken up by placing the chunks in a polyethylene bottle along with several steel rods and rolled for 6 hours.

Part C: The filler is then dispersed into a liquid resin using a Cowles' mixing blade for 25 minutes. The mixture is then poured into a 2-oz. bottle, and the viscosity measured as a functional shear rate using a Brookfield RVT Viscometer. The viscosity is measured with increasing rotational speed and then with decreasing rotational speed. Viscometer readings are converted into centipoise and the results recorded. To determine if the mixture exhibits yield stress, a spindle is rotated to give a reading of 15 to 20 percent of scale, at 0 rpm and released. A nonzero reading after 2 minutes is taken as an indication of the presence of yield stress. Yield stress values are recorded as percent of scale reading.

Part D: For comparative purposes, the procedures of Part C are repeated using untreated filler with the polyesters, and with both treated and untreated fillers in epoxy resins.

Materials Used

E/AA copolymer: the ethylene acrylic acid copolymer is a 20 percent acrylic acid, 80 percent ethylene copolymer having a melt flow viscosity of 300.

Calcium carbonate: the calcium carbonate is a 3 micron diameter product available from Genstar Stone Products Company, Hunt Valley, MD, USA under the trademark of Camel Wite. The treated calcium carbonate has 1 weight percent polymer present.

Alumina Trihydrate: the alumina trihydrate is a 5 micron diameter product available from Great Lakes Mineral, Troy, MI, USA, under the trademark GHA-431. The treated alumina trihydrate has 2.4 weight percent polymer.

Polyester: a first polyester used is a "vinyl ester resin," available from The Dow Chemical Company, Midland, MI, USA, under the trademark DERAKANE ® 510-A-40 vinyl ester resin. A second polyester is a medium reactivity resilient isothalic polyester resin available from Owens-Corning Fiberglas Corporation, Toledo, OH, USA, sold under the trademark Polyester Resin E-606.

The results of the evaluations are shown in Tables I-IX.

TABLE I

10% $CaCO_3$ in Polyester Resin E-606
25° C., Spindle #5
Viscosity Centipoise

| RPM | Untreated* | E/AA Treated |
|---|---|---|
| 2.5 | 5760 | 8800 |
| 5 | 5920 | 7600 |
| 10 | 5960 | 6960 |
| 20 | 5800 | 6320 |
| 50 | 5680 | 5808 |
| 100[1] | 5050 | 5550 |
| 50 | 5640 | 5800 |
| 20 | 5700 | 6120 |
| 10 | 5760 | 6800 |
| 5 | 5760 | 7600 |
| 2.5 | 5760 | 8640 |
| Yield | 0 | 0 |

*Not an example of the invention.
[1]Spindle #6, #5 off-scale.

TABLE II

10% ATH in Polyester Resin E-606
25° C., Spindle #5
Viscosity Centipoise

| RPM | Untreated* | E/AA Treated |
|---|---|---|
| 2.5 | 5760 | 8800 |
| 5 | 6000 | 8400 |
| 10 | 6000 | 8000 |
| 20 | 6040 | 7640 |
| 50 | 5984 | 7207 |
| 100[1] | 5800 | 6630 |
| 50 | 5976 | 7120 |
| 20 | 6040 | 7360 |
| 10 | 6000 | 7800 |
| 5 | 6080 | 8480 |
| 2.5 | 5920 | 9120 |
| Yield | 0 | 0 |

*Not an example of the invention.
[1]Spindle #6, #5 off-scale.

TABLE III

20% $CaCO_3$ in Polyester Resin E-606
25° C., Spindle #6
Viscosity Centipoise

| RPM | Untreated* | E/AA Treated |
|---|---|---|
| 2.5 | 7200 | 18000 |
| 5 | 8400 | 15000 |
| 10 | 8300 | 12700 |
| 20 | 8250 | 11000 |
| 50 | 8120 | 9447 |
| 100 | 8080 | 8770 |
| 50 | 8120 | 9200 |
| 20 | 8250 | 10500 |
| 10 | 8300 | 12000 |
| 5 | 8400 | 14600 |
| 2.5 | 8000 | 18000 |
| Yield | 0 | 0 |

*Not an example of the invention.

TABLE IV

20% ATH in Polyester Resin E-606
25° C., Spindle #6
Viscosity Centipoise

| RPM | Untreated* | E/AA Treated |
|---|---|---|
| 2.5 | 8000 | 12800 |
| 5 | 7600 | 10400 |
| 10 | 7500 | 9200 |
| 20 | 7350 | 8250 |
| 50 | 7200 | 7400 |

TABLE IV-continued

20% ATH in Polyester Resin E-606
25° C., Spindle #6
Viscosity Centipoise

| RPM | Untreated* | E/AA Treated |
|---|---|---|
| 100 | 7200 | 6970 |
| 50 | 7100 | 7280 |
| 20 | 7150 | 8100 |
| 10 | 7200 | 9200 |
| 5 | 7600 | 11000 |
| 2.5 | 7600 | 14000 |
| Yield | 0 | 0 |

*Not an example of the invention.

TABLE V

20% CaCO$_3$ in DERAKANE 510-A-40
25° C., Spindle #5
Viscosity Centipoise

| RPM | Untreated* | E/AA Treated |
|---|---|---|
| 2.5 | 800 | 3680 |
| 5 | 800 | 2720 |
| 10 | 800 | 2160 |
| 20 | 780 | 1780 |
| 50 | 720 | 1376 |
| 100 | 720 | 1228 |
| 50 | 720 | 1320 |
| 20 | 700 | 1600 |
| 10 | 800 | 2000 |
| 5 | 800 | 2560 |
| 2.5 | 800 | 3520 |
| Yield | 0 | 0.1 |

*Not an example of the invention.

TABLE VI

40% CaCO$_3$ in DERAKANE 510-A-40
25° C., Spindle #6
Viscosity Centipoise

| RPM | Untreated* | E/AA Treated |
|---|---|---|
| 2.5 | 6800 | 29600 |
| 5 | 5400 | 18800 |
| 10 | 4000 | 12400 |
| 20 | 3150 | 8500 |
| 50 | 2400 | 5200 |
| 100 | 2150 | 4050 |
| 50 | 2400 | 5000 |
| 20 | 3000 | 7770 |
| 10 | 4000 | 11300 |
| 5 | 5600 | 17000 |
| 2.5 | 6800 | 28800 |
| Yield | 0 | 0.7 |

*Not an example of the invention.

TABLE VII

40% ATH in DERAKANE 510-A-40
25° C., Spindle #6
Viscosity Centipoise

| RPM | Untreated* | E/AA Treated |
|---|---|---|
| 2.5 | 4000 | 25600 |
| 5 | 4000 | 16400 |
| 10 | 3900 | 10900 |
| 20 | 3500 | 7850 |
| 50 | 3180 | 5340 |
| 100 | 3000 | 4300 |
| 50 | 3100 | 5200 |
| 20 | 3250 | 7450 |
| 10 | 3500 | 10400 |
| 5 | 3600 | 15200 |
| 2.5 | 3600 | 23600 |
| Yield | 0 | 0.9 |

*Not an example of the invention.

TABLE VIII

10% CaCO$_3$ in D.E.R. ® 331 Epoxy Resin
25° C., Spindle #6
Viscosity Centipoise

| RPM | Untreated* | E/AA Treated* |
|---|---|---|
| 2.5 | 14400 | 8000 |
| 5 | 15000 | 8200 |
| 10 | 15300 | 8300 |
| 20 | 15350 | 8600 |
| 50 | 15200 | 8740 |
| 100 | — | 9150 |
| 50 | 15200 | 9400 |
| 20 | 15400 | 9700 |
| 10 | 15600 | 10000 |
| 5 | 16000 | 10200 |
| 2.5 | 16800 | 10800 |
| Yield | 0 | 0 |

*Not an example of the invention.
®Trademark of The Dow Chemical Company

TABLE IX

20% CaCO$_3$ in D.E.R. ® 331 Epoxy Resin
25° C., Spindle #6
Viscosity Centipoise

| RPM | Untreated* | E/AA Treated* |
|---|---|---|
| 2.5 | 22000 | 15600 |
| 5 | 22200 | 16400 |
| 10 | 22500 | 16400 |
| 20 | 22400 | 16250 |
| 50 | — | 16080 |
| 100 | — | — |
| 50 | — | 16280 |
| 20 | 22400 | 16600 |
| 10 | 22700 | 17000 |
| 5 | 23000 | 17600 |
| 2.5 | 22000 | 18800 |
| Yield | 0 | 0 |

*Not an example of the invention.
®Trademark of he Dow Chemical Company

The data in Tables I–VII illustrate the improvement in thixotropic properties of liquid polyester resins containing the treated fillers. Similar compositions containing untreated fillers do not show these thixotropic properties. More particularly Tables III–VII indicate that the viscosity of the same resin and filler level is significantly higher with the treated filler than with the untreated filler. The compositions with the treated filler additionally showing very good thixotropic properties.

In Tables VI and VII, small decreases in viscosity are observed with untreated fillers, however, the treated fillers significantly enhance this property. This greatly enhanced thixotropic property is especially significant in view of the increase in viscosity imparted by the treated fillers.

Further differences between the treated and untreated fillers are indicated in Tables V–VII, where the treated filler compositions exhibit a yield stress whereas untreated fillers do not.

Finally, the data in Tables VIII and IX show that epoxy resins filled with treated fillers do not exhibit thixotropic properties.

What is claimed is:

1. A filled resin composition having thixotropic properties comprising
   a. a liquid polyester; and
   b. a solid filler which has been treated with a polymer of (1) an addition polymerizable organic monomer which does not contain an acid group, and (2) an addition polymerizable acid in an amount sufficient to enable the treated filler to impart thixotropic properties to said liquid polyester.

2. The composition of claim 1 wherein the organic monomer which does not contain an acid group is an acyclic alkene having terminal unsaturation.

3. The composition of claim 2 wherein the acyclic alkene is selected from the group consisting ethylene, propylene, and 1-butene.

4. The composition of claim 2 wherein the acyclic alkene is ethylene.

5. The composition of claim 1 wherein the addition polymerizable acid is a monoethylenically unsaturated carboxylic acid.

6. The composition of claim 5 wherein the carboxylic acid is acrylic acid.

7. The composition of claim 1 wherein the filler particles are basic.

8. The composition of claim 1 wherein the filler particles comprise calcium carbonate or alumina trihydrate.

9. The composition of claim 1 wherein the liquid polyester resin contains addition polymerizable unsaturation.

10. A cured product comprising the composition of claim 9 wherein the addition polymerizable moieties have been addition polymerized.

* * * * *